(12) United States Patent
Masini

(10) Patent No.: US 10,833,864 B2
(45) Date of Patent: Nov. 10, 2020

(54) GAMING CONCENSUS PROTOCOL FOR BLOCKCHAIN

(71) Applicant: International Business Machines Corporation, Armonk, NY (US)

(72) Inventor: Diego A. Masini, La Plata (AR)

(73) Assignee: International Business Machines Corporation, Armonk, NY (US)

(*) Notice: Subject to any disclaimer, the term of this patent is extended or adjusted under 35 U.S.C. 154(b) by 328 days.

(21) Appl. No.: 15/952,537

(22) Filed: Apr. 13, 2018

(65) Prior Publication Data

US 2019/0314726 A1 Oct. 17, 2019

(51) Int. Cl.
| | |
|---|---|
| H04L 29/06 | (2006.01) |
| H04L 9/32 | (2006.01) |
| A63F 13/71 | (2014.01) |
| A63F 13/822 | (2014.01) |
| A63F 13/792 | (2014.01) |
| A63F 13/34 | (2014.01) |
| A63F 13/335 | (2014.01) |
| A63F 13/79 | (2014.01) |

(52) U.S. Cl.
CPC .......... *H04L 9/3236* (2013.01); *A63F 13/335* (2014.09); *A63F 13/34* (2014.09); *A63F 13/71* (2014.09); *A63F 13/79* (2014.09); *A63F 13/792* (2014.09); *A63F 13/822* (2014.09); *A63F 2300/5533* (2013.01); *H04L 2209/38* (2013.01); *H04L 2209/56* (2013.01)

(58) Field of Classification Search
None
See application file for complete search history.

(56) References Cited

U.S. PATENT DOCUMENTS

| | | | |
|---|---|---|---|
| 2015/0332283 A1 | 11/2015 | Witchey | |
| 2017/0084118 A1* | 3/2017 | Robinson | G06F 17/3241 |
| 2017/0228822 A1 | 8/2017 | Creighton et al. | |
| 2017/0237554 A1 | 8/2017 | Jacobs et al. | |
| 2017/0243193 A1 | 8/2017 | Manian et al. | |
| 2017/0346693 A1 | 11/2017 | Dix et al. | |
| 2018/0039667 A1 | 2/2018 | Pierce et al. | |
| 2019/0282906 A1* | 9/2019 | Yong | A63F 13/79 |

OTHER PUBLICATIONS

Li, A. et al., "A Blockchain for network Function Workflow validation Using Forward Prediction",; http://ip.com/IPCOM/000250638D; Aug. 11, 2017 (Year: 2017).*
Anonymously; "Storing and Verifying Network Flows in a Blockchain"; http://ip.com/IPCOM/000251439D; Nov. 1, 2017.
Bitfury Group Limited; "Proof of Stake versus Proof of Work"; Whitepaper, BitFury Group Limited; Sep. 13, 2015.
Kwon, J.; "Tendermint: Consensus without Mining"; http://github.com/tendermint/wiki ; 2014.

(Continued)

*Primary Examiner* — Andrew J Steinle

(57) ABSTRACT

An example operation may include one or more of receiving, by gaming peers of a gaming network, a number of transactions from a blockchain network, electing a subset of gaming peers to verify the transactions and a leader from the subset of gaming peers, generating, by the leader, a block comprising the number of transactions, validating the block, by the subset of gaming peers, and broadcasting the block to the blockchain network.

20 Claims, 11 Drawing Sheets

(56) References Cited

OTHER PUBLICATIONS

Li, A. et al.; "A Blockchain for Network Function Workflow Validation Using Forward Prediction"; http://ip.com/IPCOM/000250638D; Aug. 11, 2017.
Milutinovic, M. et al.; "Proof of Luck: an Efficient Blockchain Consensus Protocol"; SysTEX '16; Dec. 12-16, 2016.
Rao, LP. et al.; "Efficient Path Characteristics Orchestration for Blockchain Applications"; http://ip.com/IPCOM/000250842D; Sep. 8, 2017.

* cited by examiner

128

GAMING CONCENSUS PROTOCOL FOR BLOCKCHAIN

TECHNICAL FIELD

This application generally relates to blockchain networks, and more particularly, relates to a gaming consensus protocol for a blockchain.

BACKGROUND

A ledger is commonly defined as an account book of entry, in which transactions are recorded. A distributed ledger is ledger that is replicated in whole or in part to multiple computers. A Cryptographic Distributed Ledger (CDL) can have at least some of these properties: irreversibility (once a transaction is recorded, it cannot be reversed), accessibility (any party can access the CDL in whole or in part), chronological and time-stamped (all parties know when a transaction was added to the ledger), consensus based (a transaction is added only if it is approved, typically unanimously, by parties on the network), verifiability (all transactions can be cryptographically verified). A blockchain is an example of a CDL. While the description and figures herein are described in terms of a blockchain, the instant application applies equally to any CDL.

A distributed ledger is a continuously growing list of records that typically apply cryptographic techniques such as storing cryptographic hashes relating to other blocks. A blockchain is one common instance of a distributed ledger and may be used as a public ledger to store information. Although, primarily used for financial transactions, a blockchain can store various information related to goods and services (i.e., products, packages, status, etc.). A decentralized scheme provides authority and trust to a decentralized network and enables its nodes to continuously and sequentially record their transactions on a public "block", creating a unique "chain" referred to as a blockchain. Cryptography, via hash codes, is used to secure an authentication of a transaction source and removes a central intermediary. A blockchain is a distributed database that maintains a continuously-growing list of records in the blockchain blocks, which are secured from tampering and revision due to their immutable properties. Each block contains a timestamp and a link to a previous block. A blockchain can be used to hold, track, transfer and verify information. Since a blockchain is a distributed system, before adding a transaction to a blockchain ledger, all peers need to reach a consensus status.

Conventionally, blockchain networks have a limited number of nodes or peers to participate in consensus operations, which limits transactions throughputs As such, what is needed is an expanded blockchain network to overcome this issue.

SUMMARY

One example embodiment may provide a system that includes one or more of a blockchain network and a gaming network, coupled to the blockchain network. The gaming network includes one or more gaming peers, configured to receive transactions from the blockchain network, and in response elect a subset of gaming peers to verify the transactions and a leader from the subset of gaming peers, generate, by the leader, a block comprising the number of transactions, validate the block, by the subset of gaming peers, and broadcast the block to the blockchain network.

An example operation may include one or more of receiving, by gaming peers of a gaming network, a number of transactions from a blockchain network, electing a subset of gaming peers to verify the transactions and a leader from the subset of gaming peers, generating, by the leader, a block comprising the number of transactions, validating the block, by the subset of gaming peers, and broadcasting the block to the blockchain network.

A further example embodiment may provide a non-transitory computer readable medium comprising instructions, that when read by a processor, cause the processor to perform one or more of receiving, by gaming peers of a gaming network, a number of transactions from a blockchain network, electing a subset of gaming peers to verify the transactions and a leader from the subset of gaming peers, generating, by the leader, a block comprising the number of transactions, validating the block, by the subset of gaming peers, and broadcasting the block to the blockchain network.

DETAILED DESCRIPTION

Figure 1A:
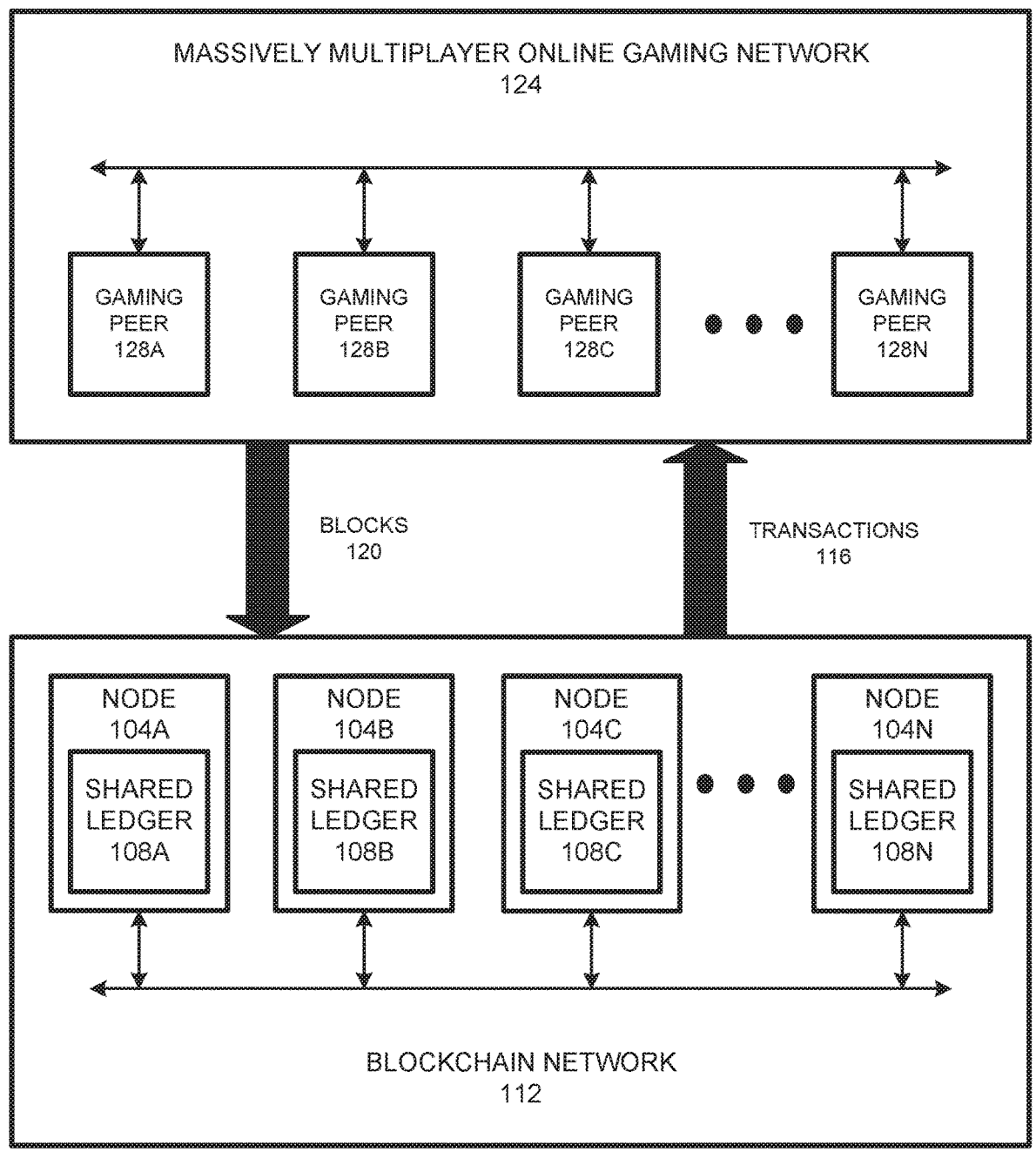
FIG. 1A illustrates a logic network diagram of an expanded blockchain network, according to example embodiments.

It will be readily understood that the instant components, as generally described and illustrated in the figures herein, may be arranged and designed in a wide variety of different configurations. Thus, the following detailed description of the embodiments of one or more of a method, apparatus, non-transitory computer readable medium and system, as represented in the attached figures, is not intended to limit the scope of the application as claimed but is merely representative of selected embodiments.

The instant features, structures, or characteristics as described throughout this specification may be combined in any suitable manner in one or more embodiments. For example, the usage of the phrases "example embodiments", "some embodiments", or other similar language, throughout this specification refers to the fact that a particular feature, structure, or characteristic described in connection with the embodiment may be included in one or more embodiments. Thus, appearances of the phrases "example embodiments", "in some embodiments", "in other embodiments", or other similar language, throughout this specification do not necessarily all refer to the same group of embodiments, and the described features, structures, or characteristics may be combined in any suitable manner in one or more embodiments.

In addition, while the term "message" may have been used in the description of embodiments, the application may be applied to many types of network data, such as, packet, frame, datagram, etc. The term "message" also includes packet, frame, datagram, and any equivalents thereof. Furthermore, while certain types of messages and signaling may be depicted in exemplary embodiments they are not limited to a certain type of message, and the application is not limited to a certain type of signaling.

A blockchain is a distributed system which includes multiple nodes that communicate with each other. A blockchain operates programs called chaincode (e.g., smart contracts, etc.), holds state and ledger data, and executes transactions. Some transactions are operations invoked on the chaincode. In general, blockchain transactions typically must be "endorsed" by certain blockchain members and only endorsed transactions may be committed to the blockchain and have an effect on the state of the blockchain. Other transactions which are not endorsed are disregarded. There may exist one or more special chaincodes for management functions and parameters, collectively called system chaincodes.

Nodes are the communication entities of the blockchain system. A "node" may perform a logical function in the sense that multiple nodes of different types can run on the same physical server. Nodes are grouped in trust domains and are associated with logical entities that control them in various ways. Nodes may include different types, such as a client or submitting-client node which submits a transaction-invocation to an endorser (e.g., peer), and broadcasts transaction-proposals to an ordering service (e.g., ordering node). Another type of node is a peer node which can receive client submitted transactions, commit the transactions and maintain a state and a copy of the ledger of blockchain transactions. Peers can also have the role of an endorser, although it is not a requirement. An ordering-service-node or orderer is a node running the communication service for all nodes, and which implements a delivery guarantee, such as a broadcast to each of the peer nodes in the system when committing transactions and modifying a world state of the blockchain, which is another name for the initial blockchain transaction which normally includes control and setup information.

A ledger is a sequenced, tamper-resistant record of all state transitions of a blockchain. State transitions may result from chaincode invocations (i.e., transactions) submitted by participating parties (e.g., client nodes, ordering nodes, endorser nodes, peer nodes, etc.). A transaction may result in a set of asset key-value pairs being committed to the ledger as one or more operands, such as creates, updates, deletes, and the like. The ledger includes a blockchain (also referred to as a chain) which is used to store an immutable, sequenced record in blocks. The ledger also includes a state database which maintains a current state of the blockchain. There is typically one ledger per channel. Each peer node maintains a copy of the ledger for each channel of which they are a member.

A chain is a transaction log which is structured as hash-linked blocks, and each block contains a sequence of N transactions where N is equal to or greater than one. The block header includes a hash of the block's transactions, as well as a hash of the prior block's header. In this way, all transactions on the ledger may be sequenced and cryptographically linked together. Accordingly, it is not possible to tamper with the ledger data without breaking the hash links. A hash of a most recently added blockchain block represents every transaction on the chain that has come before it, making it possible to ensure that all peer nodes are in a consistent and trusted state. The chain may be stored on a peer node file system (i.e., local, attached storage, cloud, etc.), efficiently supporting the append-only nature of the blockchain workload.

The current state of the immutable ledger represents the latest values for all keys that are included in the chain transaction log. Because the current state represents the latest key values known to a channel, it is sometimes referred to as a world state. Chaincode invocations execute transactions against the current state data of the ledger. To make these chaincode interactions efficient, the latest values of the keys may be stored in a state database. The state database may be simply an indexed view into the chain's transaction log, it can therefore be regenerated from the chain at any time. The state database may automatically be recovered (or generated if needed) upon peer node startup, and before transactions are accepted.

The instant application in one embodiment relates to blockchain networks, and more in another embodiment relates to faster transaction and block validation for a blockchain. Example embodiments provide methods, devices, networks and/or systems, which support fast transaction processing for public and permissioned blockchain networks. Before proceeding to describing the proposed solution, the choice of blockchain implementation that can be used is discussed. While many implementations of blockchain technology for generic document transactions are available (e.g., Ethereum), the present application may employ a permissioned blockchain network, where the blockchain nodes are operated by known whitelisted entities. The identities for these entities (often defined by public and private key pairs) are granted by an issuing authority on the network. One example of such a permissioned blockchain network is the opensource Hyperledger Fabric. Fabric has a modular architecture that allows network administrators to define their own constraints and then set-up the protocols accordingly. Fabric also provides the following special features, some of which are herein.

Chaincode extends the concept of traditional smart contracts. Apart from providing a mechanism to define assets and instructions (business logic) to modify the assets, chaincode is also immutable, may retain state, and inherits confidentiality/privacy. Networks can limit who can view or interact at different levels of the environment (variable confidentiality). Individual transactions can even impose their own confidentiality rules. While the network can set identity obfuscation, it is possible to have 100% anonymous peers whose identity is also provable and unique with secure cryptographic techniques (variable identification). If the users of a network grant permission, an auditor will be able to de-anonymize users and their transactions. This is useful for regulatory inspection and analysis. The details of a transaction, including but not limited to chaincode, peers, assets, and volumes are encrypted (private transactions). This eliminates any pattern recognition or leaked private information to non-authorized actors on the network. Only specified actors can decrypt, view and interact/execute (with chaincode). Finally, fabric can easily operate with almost any consensus mechanism.

FIG. 1A illustrates a logic network diagram of an expanded blockchain network 100, according to example embodiments. Referring to FIG. 1A, the system 100 includes a blockchain network 112, which includes a group of nodes 104, identified as node 104A, node 104B, and node 104C through node 104N. The blockchain nodes 104 generate transactions 116 and store blocks 120 including the transactions 116 to shared ledgers 108. The shared ledger 108 is distributed among all blockchain nodes 104, such that node 104A is associated with shared ledger 108A, node 104B is associated with shared ledger 108B, node 104C is associated with shared ledger 108C, and node 104N is associated with shared ledger 108N. The blockchain network 112 may be either a public or private (permissioned) blockchain network 112.

The blockchain network 112 may be related or unrelated to a massive multiplayer online game network 124. In a bitcoin blockchain network 112, there are two types of nodes 104: non-miner and miner nodes 104. Non-miner nodes 104 listen for blocks, validate them, and update its local copy of a smart ledger 108 with the blocks found valid. Miner nodes 104 listen for transactions, validate transactions, generate blocks of transactions, compute a proof-of-work for the block, and broadcast the newly generated block to the rest of the blockchain network 112. Therefore, in this case miner nodes 104 execute the proof-of-work consensus protocol of a bitcoin blockchain network 112.

A Hyperledger Fabric blockchain network works in a different way. In a A Hyperledger Fabric blockchain network, there are also two main types of nodes 104: endorsers and orderers. Endorsers receive transaction proposals, simulate its execution, generate a read/write set, and endorse the transaction proposal if no errors are found. The endorsed transaction proposal is then returned to a client that submitted the transaction. Once the client collects enough endorsed transaction proposals (where enough depends on the endorsement policy used), it sends a transaction to the orderers. Orderers validate the read/write set for each transaction received, verify the endorsements of each transaction, order the transactions inside a block, and propagate newly created blocks to the rest of the blockchain network 112. In this case, orderers execute the consensus protocol of the Hyperledger Fabric blockchain network 112. Not all the nodes 104 in a blockchain network 112 perform the same tasks and usually there are a subset of nodes 104 executing the consensus protocol of the blockchain network 112. A consensus protocol is a mechanism to determine the order of transactions inside a block in a distributed fashion.

Consensus algorithms are an essential part of blockchain networks 112 due to the lack of trust among participants of the blockchain network 112. The blockchain network 112 trusts nodes 104 either because a trusted consensus protocol is used (like proof-of-work or proof-of-stake), or because the blockchain network 112 is private (or permissioned) and participants need some sort of authorization to participate. In this case, since participants are known, more relaxed consensus protocols can be used (BFT-like consensus protocols for instance).

Conventionally in a blockchain network 112 where a subset of nodes 104 executes a consensus protocol, the subset of nodes 104 becomes the bottleneck of the blockchain network 112. However, if there exists a very large number of nodes 104 executing the consensus protocol and they can be trusted, then the blockchain network 112 scales accordingly, processing transactions at a faster rate. The consensus protocol disclosed herein is designed to provide trust based on the fact that gaming peers 128 executing the protocol are valid players of the massive multiplayer online game corresponding with the massive multiplayer online gaming network 124. Valid players may be confirmed by checking random elements of a game state, which provides the basis for the election rules 148. Random selection of election rules 148 is performed between all the gaming peers 128 participating in the consensus round (thus the need for the distributed random number generation), to ensure that no gaming peer 128 can tamper the election rules 148 selection (and thereby choose an election rule 148 that benefits a malicious gaming peer 128) and to ensure the leader election cannot be tampered with, as well.

Different consensus approaches have substantial impact in blockchain network 112 operations. Proof-of-work consensus algorithms require great amounts of computing power to minimize the possibility of tampering the distributed or shared ledger 108. This translates into high energy consumption and can have a negative impact both in time and resources. Proof-of-elapsed-time consensus algorithms required specialized hardware to generate a tamper resistant proof of elapsed time in leader election. At the present time, Intel is one of the main proponents of this consensus model with its SGX technology. However, a problem with this type of consensus algorithm is the degree to which clients are tied to a particular type of hardware (in this case Intel processors). Proof-of-stake consensus algorithms uses a combination of random selection and wealth or age to choose the creator of the next block. The idea behind this model is that nodes 104 more invested in the blockchain network 112 (i.e. the nodes 104 with more wealth or participation) are less prone to misbehave in the blockchain network 112. The problem with this model is that small participants (nodes 104 with the least wealth or participation in the network compared with other nodes 104) will not be able to participate in consensus, leading to a concentration of power on more wealthy participants/nodes 104.

All the nodes 104 of the blockchain network 112 maintain a distributed or shared ledger 108. Some of the nodes 104 may execute a consensus protocol. As a side effect, since there are multiple nodes 104 in the blockchain network 112, there is high availability—meaning that if a node 104 of the blockchain network 112 is not available, there are other nodes 104 that will still listen for transactions to generate new blocks, listen for blocks to update the distributed ledger 108 and listen for client requests.

The expanded blockchain network 100 also includes a massively multiplayer online gaming network 124, over which users play very large scale video games in collaboration with other networked users. Each such user is considered a gaming peer 128, with gaming peers 128A, 128B, 128C, and 128N shown. There may be any number of gaming peers 128 in the massively multiplayer online gaming network 124. At high level, the gaming peers 128 may be considered to be part of the blockchain network 112, since they each have a blockchain client 144 (see FIG. 1B) and they listen for transactions 116. However, gaming peers 128 do not maintain a copy of the distributed or shared ledger 108. In this sense, gaming peers 128 are non-committing nodes of the blockchain network 112. Hyperledger Fabric blockchain networks 112 also may have these types of nodes. Hyperledger Fabric blockchain networks 112 support pluggable consensus protocols, meaning that the consensus protocol may be replaced. Gaming peers 128 disclosed herein implement the disclosed consensus protocol and may therefore plug the disclosed consensus protocol into a Hyperledger Fabric blockchain network 112. Gaming peers 128 act like blockchain nodes 104 that can listen for blockchain transactions 116, execute the disclosed consensus protocol, and perform require interactions with a game client 140 to access the game state.

Since the gaming peers 128 each include a blockchain client 144, they are treated as part of the blockchain network 112. Users of gaming peers 128 may install a blockchain client 144 in a computing device of gaming peer 128, and join the blockchain network 112. If the blockchain network 112 is a public blockchain network (such as bitcoin), a user may configure the blockchain client 144 to act as a miner and the corresponding gaming peer 128 can still send transactions to the network 100. Therefore, a gaming peer 128 may be an end-user and also a miner executing the consensus protocol. Similarly, for a private or permissioned blockchain network 112, if a gaming peer 128 has enough privileges it can serve as an orderer (in Hyperledger Fabric terminology), execute the consensus algorithm, and also submit transactions to the network 100 (acting as an end-user). The only strong requirement is trust. Either one trusts the nodes in the expanded blockchain network 100 because it is private and it provides a relaxed consensus protocol due to participants that are known, or one trusts the nodes in the expanded blockchain network 100 because the consensus protocol is strong enough to prevent tampering.

The massively multiplayer online gaming network 124 is used to play massively multiplayer online games or massively multiplayer online role-playing games. In some networks, game state for the game being played is controlled by a central server (not shown), while in other networks 124 the game state is maintained by the gaming peers 128 and shared in a peer-to-peer arrangement. Massively multiplayer online role-playing games are a combination of role-playing video games and massively multiplayer online games in which a very large number of players interact with one another within a virtual world. As in all role-playing games, the player assumes the role of a character (often in a fantasy world or science-fiction world) and takes control over many of that character's actions. Massively multiplayer games are distinguished from single-player or small multi-player online games by the number of players able to interact together, and by the game's persistent world (usually hosted by the game's publisher), which continues to exist and evolve while the player is offline and away from the game.

Massively multiplayer online role-playing games are played throughout the world. Worldwide revenues exceeded half a billion dollars in 2005, and Western revenues exceeded a billion dollars in 2006. In 2008, the spending on subscription massively multiplayer online role-playing games by consumers in North American and Europe grew to $1.4 billion. World of Warcraft, a popular massively multiplayer online role-playing game, has over 10 million subscribers as of November 2014. World of Warcraft's total revenue was $1.04 billion US dollars in 2014. Star Wars: The Old Republic, released in 2011, became the world's fastest-growing massively multiplayer online game ever after gaining more than 1 million subscribers within the first three days of its launch. As of 2017, League of Legends, a massively multiplayer online role-playing game has an active player base of over 80 million monthly players. For the same period, Minecraft, a survival sandbox massively multiplayer online game, has reported around 55 million monthly players. When considered as gaming peers 128, this represents an enormous expansion of resources potentially available for transaction validation and block 120 creation for blockchain networks 112.

Figure 1B:
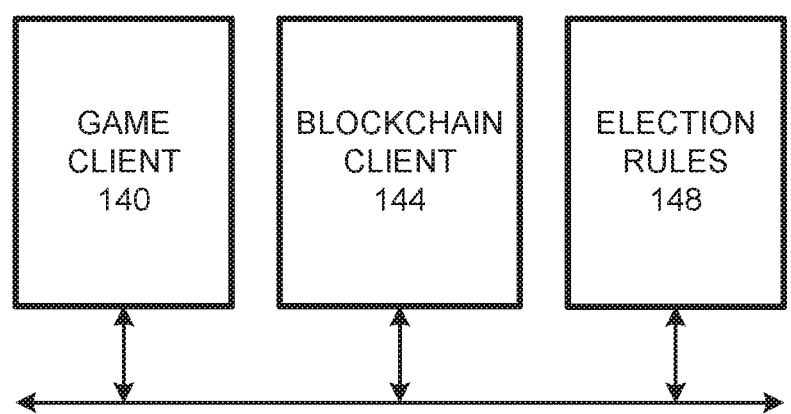
FIG. 1B illustrates components of gaming peers, according to example embodiments.

Gaming peers 128 are described in more detail in FIG. 1B. For the purpose of the present application, gaming peers 128 participate in the consensus processes disclosed herein. In some embodiments, other computing systems (not shown) may be part of massively multiplayer online gaming network 124, but not be capable of participating in the disclosed consensus processes. In other embodiments, only gaming peers 128 are included within the massively multiplayer online gaming network 124.

The present application leverages features gaming networks 124 already provide, including scalability and mechanisms for tampering detection applied to the game state. The present application describes a consensus mechanism that takes advantage of an already in-place gaming infrastructure. It should be noted that the present application is not a blockchain network 112 embedded into a gaming network 124. The consensus processes of the present application may be offered as a service to existing blockchain networks 112 in an agnostic way.

In one embodiment, the consensus algorithm is provided as a service from the game network 124 to any blockchain network 112, thus blockchain networks 112 can delegate consensus to a distributed network 124 of game clients 140 within the gaming peers 128. In the preferred embodiment, for each transaction 116 processed by the massively multiplayer online gaming network 124, a fee would apply. These fees may be distributed between the participants of the consensus round (i.e. participants/users associated with each gaming peer 128) as an incentive, be used to maintain the network infrastructure or any other purpose that serves the gaming network 124 and the players.

The gaming peers 128 would only perform consensus on the ordering of the transactions 116. The execution of smart contracts remains within the blockchain network 112. In some embodiments, smart contract execution could be moved to the massively multiplayer online gaming network 124 if the gaming peers 128 have sufficient computing power to perform the additional task of executing the smart contracts and if the business case allows it in terms of security and confidentiality.

The game state for the game associated with the massively multiplayer online gaming network 124 could be altered by an attacker to ensure a malicious gaming peer 128 would be always selected by any election rule 148. However, a malicious attacker also needs to be elected as a leader by a distributed random generation algorithm described herein. Only then the attacker would be able to tamper the block of transactions it generates. Additionally, massively multiplayer online games count with cheat-resistant protocols and game history validation approaches to limit and reduce cheating and game state tampering. Game history validation is a method that may be used to ensure the integrity and consistency of dynamic and static game state to identify and correct cheating attempts.

More than a single blockchain node 104 is needed to interface with the gaming network 124 to avoid having a single point of failure and take advantage of the high availability provided by blockchain networks 112. If the massive multiplayer online gaming network 124 interfaces with only a single node 104 of the blockchain network 112, and that node 104 goes offline for any reason, then the expanded blockchain network 100 will fail since it will not receive any transactions 116 from the blockchain network 112.

FIG. 1B illustrates components of gaming peers 128, according to example embodiments. Each gaming peer 128 is a computing system that includes a game client 140, a blockchain client 144, and election rules 148.

Each game client 140 listens for transactions 116 from the blockchain network 112. The game clients 140 always have access to the game state, and how they get updates to the game state depends on the specific design of the game played on the massive multiplayer online gaming network 124. In some embodiments, a game client 140 may obtain updates from nearby gaming peers 128 using as protocol similar to a gossip network protocol. In another embodiment, the game clients 140 push or fetch updates for the game state to/from a central server owned by the game provider (e.g. playsation network).

When a predetermined number of transactions 116 are received, a subset of the gaming peers 128 would be elected dynamically by taking into account the actions performed in the game. One of the gaming peers 128 in the subset is randomly selected to be the leader, and generates the next block 120 of transactions 116. The next block 120 includes a game state hash and a signature. The leader broadcasts the block 120 to the rest of the gaming peers 128 of the subset. Every gaming peer 128 of the subset validates the block 120 and adds its own signature to the block 120. The requirement of including a hash of the current game state is to bind the generated block 120 to a particular moment in the game (i.e. game state).

The blockchain client 144 listens for blockchain transactions 116, executes the consensus protocol described herein, and generates blocks of transactions. A subset of gaming peers 128 including blockchain clients 144 are elected by all of the gaming peers 128 by a dynamic rule to create the next block 120 for the blockchain network 112.

The election of gaming peers 128 to be in the subset of gaming peers 128 is done by applying a dynamic rule of election rules 148 that takes into account the game dynamics. The election rules 148 should include constraints to ensure all types of participants within the massively multiplayer online gaming network 124 can be elected at some point. The consensus protocol is plugged into any massively multiplayer online gaming network 124 and provided consensus as a service to any blockchain network 112.

Examples of the election rules 148 that might be applied for the election may include players with a play time higher than x minutes and lower than y minutes, players with a specific score, players with a particular item equipped at the moment of the election, and players that had achieve a particular goal inside the game, like finishing a quest or killing a final boss. Other forms of election rules 148 may be used, appropriate to the game being played. Multiple election rules 148 may be specified and composed randomly to prevent players from predicting what the next election rule 148 would be. The random selection would be performed by generating a random number in a distributed fashion by all the gaming peers 128, in order to avoid the introduction of an oracle for the random number generation. The election rules 148 preferably include conditions to ensure that every type of member of the gaming network 124 would be elected at some point to guarantee every player/gaming peer 128 could have a vote in block generation. For example, if an election rule 148 selects gaming peers 128 with high scores, there should also be a rule to select gaming peers 128 having low scores.

Advantageously, the consensus approach disclosed herein provides three obvious advantages over conventional consensus means. First, computing power used for gaming is reused to generate blocks 120 for a blockchain network 112; thus no computing power is wasted. Second, unlike a proof-of-stake consensus protocol, no concentration of power occurs by using this method since rules are crafted to ensure every gaming peer 128 has a chance to participate in a consensus phase. Third, fees applied to transactions 116 are collected by the gaming network 124 and might be used as additional incentive to users associated with gaming peers 128, to support the gaming infrastructure, or to generate a new economic model inside the gaming network 124.

Figure 2A:
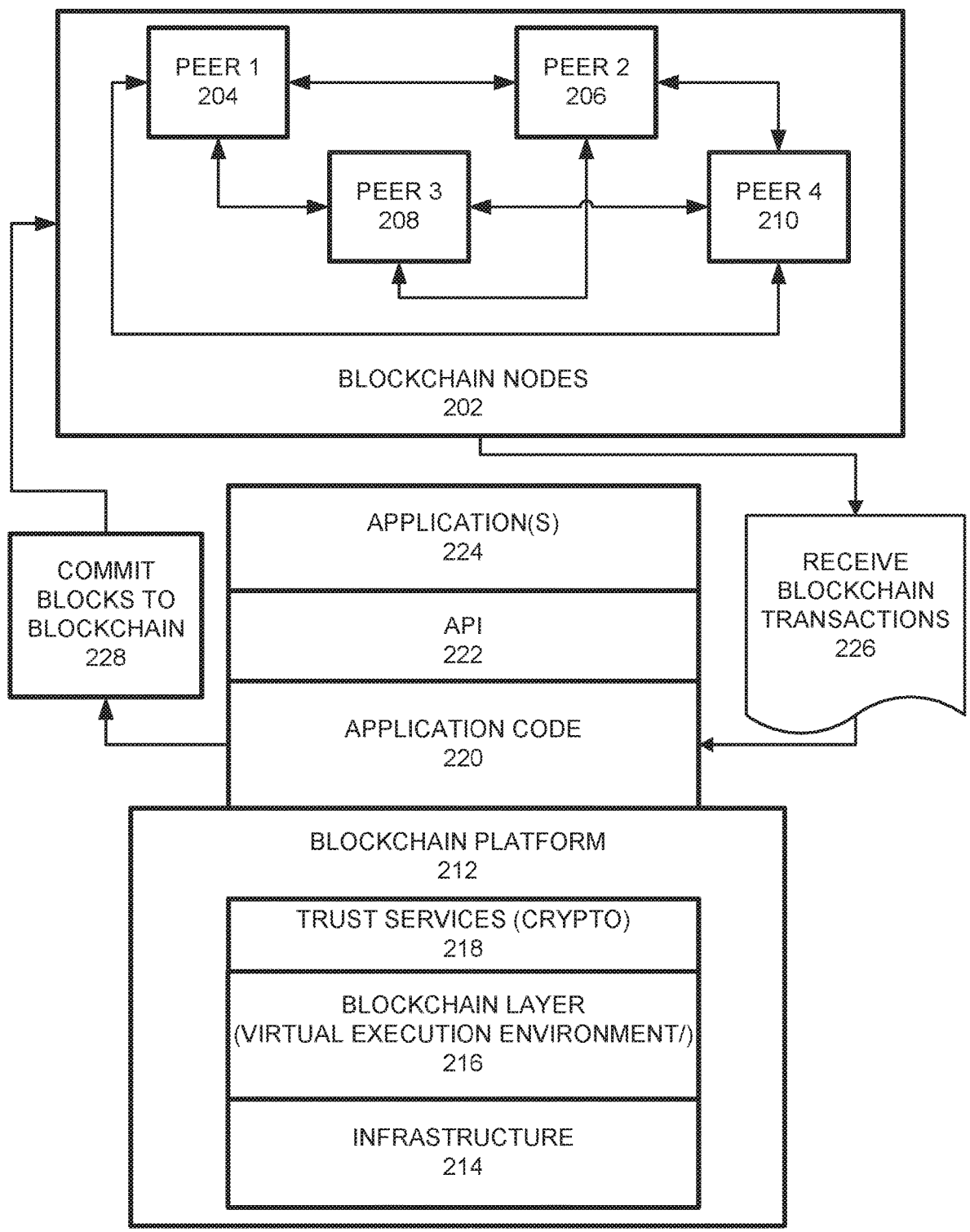
FIG. 2A illustrates an example peer node blockchain architecture configuration for an asset sharing scenario, according to example embodiments.

FIG. 2A illustrates a blockchain system architecture configuration 200, according to example embodiments. Referring to FIG. 2A, blockchain architecture 200 may include certain blockchain elements, for example, a group 202 of blockchain nodes 204, 206, 208, and 210, which participate in blockchain transaction addition and validation process (consensus). One or more of the blockchain nodes 202 may endorse transactions and one or more blockchain nodes 202 may fulfill transactions as an orderer. A blockchain node may initiate a blockchain authentication and seek to write to a blockchain immutable ledger stored in blockchain layer 216, a copy of which may also be stored on the underpinning physical infrastructure 214. The blockchain configuration may include one or applications 224 which are linked to application programming interfaces (APIs) 222 to access and execute stored program/application code 220 (e.g., chaincode, smart contracts, etc.) which can be created according to a customized configuration sought by participants and can maintain their own state, control their own assets, and receive external information. This can be deployed as a transaction and installed, via appending to the distributed ledger, on all blockchain nodes 202.

The blockchain base or platform 212 may include various layers of blockchain data, services (e.g., cryptographic trust services, virtual execution environment, etc.), and underpinning physical computer infrastructure that may be used to receive and store new transactions and provide access to auditors which are seeking to access data entries. The blockchain layer 216 may expose an interface that provides access to the virtual execution environment necessary to process the program code and engage the physical infrastructure 214. Cryptographic trust services 218 may be used to verify transactions such as asset exchange transactions and keep information private.

The blockchain architecture configuration of FIG. 2A may process and execute program/application code 220 via one or more interfaces exposed, and services provided, by blockchain platform 212. The code 220 may control blockchain assets. For example, the code 220 can store and transfer data, and may be executed by nodes 202 in the form of a smart contract and associated chaincode with conditions or other code elements subject to its execution. As a non-limiting example, smart contracts may be created to execute reminders, updates, and/or other notifications subject to the changes, updates, etc. The smart contracts may themselves be used to identify rules associated with authorization and access requirements and usage of the ledger. For example, blockchain transactions may be received 226 from nodes or peers 204-210 and may be processed by one or more processing entities (e.g., virtual machines) included in the blockchain layer 216. The result 228 may commit blocks of transactions that are provided to blockchain nodes 202 to access.

Within chaincode, a smart contract may be created via a high-level application and programming language, and then written to a block in the blockchain. The smart contract may include executable code which is registered, stored, and/or replicated with a blockchain (e.g., distributed network of blockchain peers). A transaction is an execution of the smart contract code which can be performed in response to conditions associated with the smart contract being satisfied. The executing of the smart contract may trigger a trusted modification(s) to a state of a digital blockchain ledger. The modification(s) to the blockchain ledger caused by the smart contract execution may be automatically replicated throughout the distributed network of blockchain peers through one or more consensus protocols.

The smart contract may write data to the blockchain in the format of key-value pairs. Furthermore, the smart contract code can read the values stored in a blockchain and use them in application operations. The smart contract code can write the output of various logic operations into the blockchain. The code may be used to create a temporary data structure in a virtual machine or other computing platform. Data written to the blockchain can be public and/or can be encrypted and maintained as private. The temporary data that is used/generated by the smart contract is held in memory by the supplied execution environment, then deleted once the data needed for the blockchain is identified.

A chaincode may include the code interpretation of a smart contract, with additional features. As described herein, the chaincode may be program code deployed on a computing network, where it is executed and validated by chain validators together during a consensus process. The chaincode receives a hash and retrieves from the blockchain a hash associated with the data template created by use of a previously stored feature extractor. If the hashes of the hash identifier and the hash created from the stored identifier template data match, then the chaincode sends an authorization key to the requested service. The chaincode may write to the blockchain data associated with the cryptographic details. In this example of FIG. 2A, blocks 228 are committed to the blockchain nodes 202 as part of processes to allow blockchain nodes 202 to access needed transaction information.

Figure 2B:
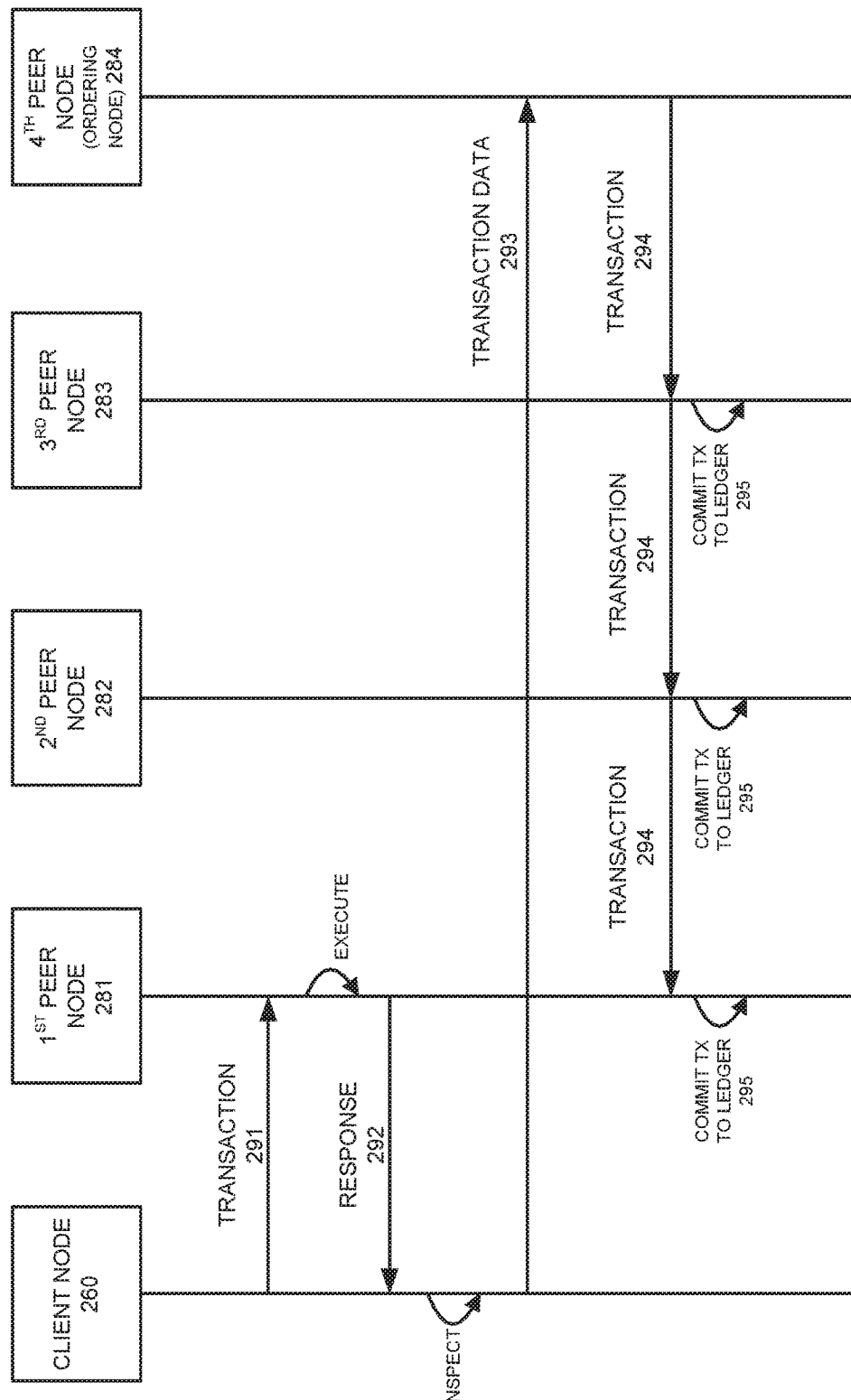
FIG. 2B illustrates an example of a transactional flow between nodes of the blockchain, according to example embodiments.

FIG. 2B illustrates an example of a transactional flow 250 between nodes of the blockchain in accordance with an example embodiment. Referring to FIG. 2B, the transaction flow 250 may include a transaction proposal 291 sent by an application client node 260 to an endorsing peer node 281. The endorsing peer 281 may verify the client signature and execute a chaincode function to initiate the transaction. The output may include the chaincode results, a set of key/value versions that were read in the chaincode (read set), and the set of keys/values that were written in chaincode (write set). The proposal response 292 is sent back to the client 260 along with an endorsement signature, if approved. The client node 260 assembles the endorsements into a transaction payload 293 and broadcasts it to an ordering service node 284. The ordering service node 284 then delivers ordered transactions as blocks to all peers 281-283 on a channel. Before committal to the blockchain, each peer 281-283 may validate the transaction. For example, the peers or nodes 281-283 may check the endorsement policy to ensure that the correct allotment of the specified peers have signed the results and authenticated the signatures against the transaction payload 293.

Referring again to FIG. 2B, the client node 260 initiates the transaction 291 by constructing and sending a request to the peer node 281, which is an endorser. The client node 260 may include an application leveraging a supported software development kit (SDK), such as NODE, JAVA, PYTHON, and the like, which utilizes an available API to generate a transaction proposal. The proposal is a request to invoke a chaincode function so that data can be read and/or written to the ledger (i.e., write new key value pairs for the assets). The SDK may serve as a shim to package the transaction proposal into a properly architected format (e.g., protocol buffer over a remote procedure call (RPC)) and take the client's cryptographic credentials to produce a unique signature for the transaction proposal.

In response, the endorsing peer node 281 may verify (a) that the transaction proposal is well formed, (b) the transaction has not been submitted already in the past (replay-attack protection), (c) the signature is valid, and (d) that the submitter (client node 260, in the example) is properly authorized to perform the proposed operation on that channel. The endorsing peer node 281 may take the transaction proposal inputs as arguments to the invoked chaincode function. The chaincode is then executed against a current state database to produce transaction results including a response value, read set, and write set. However, no updates are made to the ledger at this point. In 292, the set of values along with the endorsing peer node's 281 signature is passed back as a proposal response 292 to the SDK of the client node 260, which parses the payload for the application to consume.

In response, the application of the client node 260 inspects/verifies the endorsing peers signatures and compares the proposal responses to determine if the proposal response is the same. If the chaincode only queried the ledger, the application would inspect the query response and would typically not submit the transaction to the ordering node service 284. If the client application intends to submit the transaction to the ordering node service 284 to update the ledger, the application determines if the specified endorsement policy has been fulfilled before submitting (i.e., did all peer nodes necessary for the transaction endorse the transaction). Here, the client node 260 may include only one of multiple parties to the transaction. In this case, each client may have their own endorsing node, and each endorsing node will need to endorse the transaction. The architecture is such that even if an application selects not to inspect responses or otherwise forwards an unendorsed transaction, the endorsement policy will still be enforced by nodes and upheld at the commit validation phase.

After successful inspection, in step 293 the client node 260 assembles endorsements into a transaction and broadcasts the transaction proposal and response within a transaction message to the ordering node 284. The transaction may contain the read/write sets, the endorsing peers signatures and a channel ID. The ordering node 284 does not need to inspect the entire content of a transaction in order to perform its operation, instead the ordering node 284 may simply receive transactions from all channels in the network, order them chronologically by channel, and create blocks of transactions per channel.

The blocks of the transaction are delivered from the ordering node 284 to all peer nodes 281-283 on the channel. The transactions 294 within the block are validated to ensure any endorsement policy is fulfilled and to ensure that there have been no changes to ledger state for read set variables since the read set was generated by the transaction execution. Transactions in the block are tagged as being valid or invalid. Furthermore, in step 295 each peer node 281-283 appends the block to the channel's chain, and for each valid transaction the write sets are committed to current state database. An event is emitted to notify the client application that the transaction (invocation) has been immutably appended to the chain, as well as to notify whether the transaction was validated or invalidated.

Figure 3:
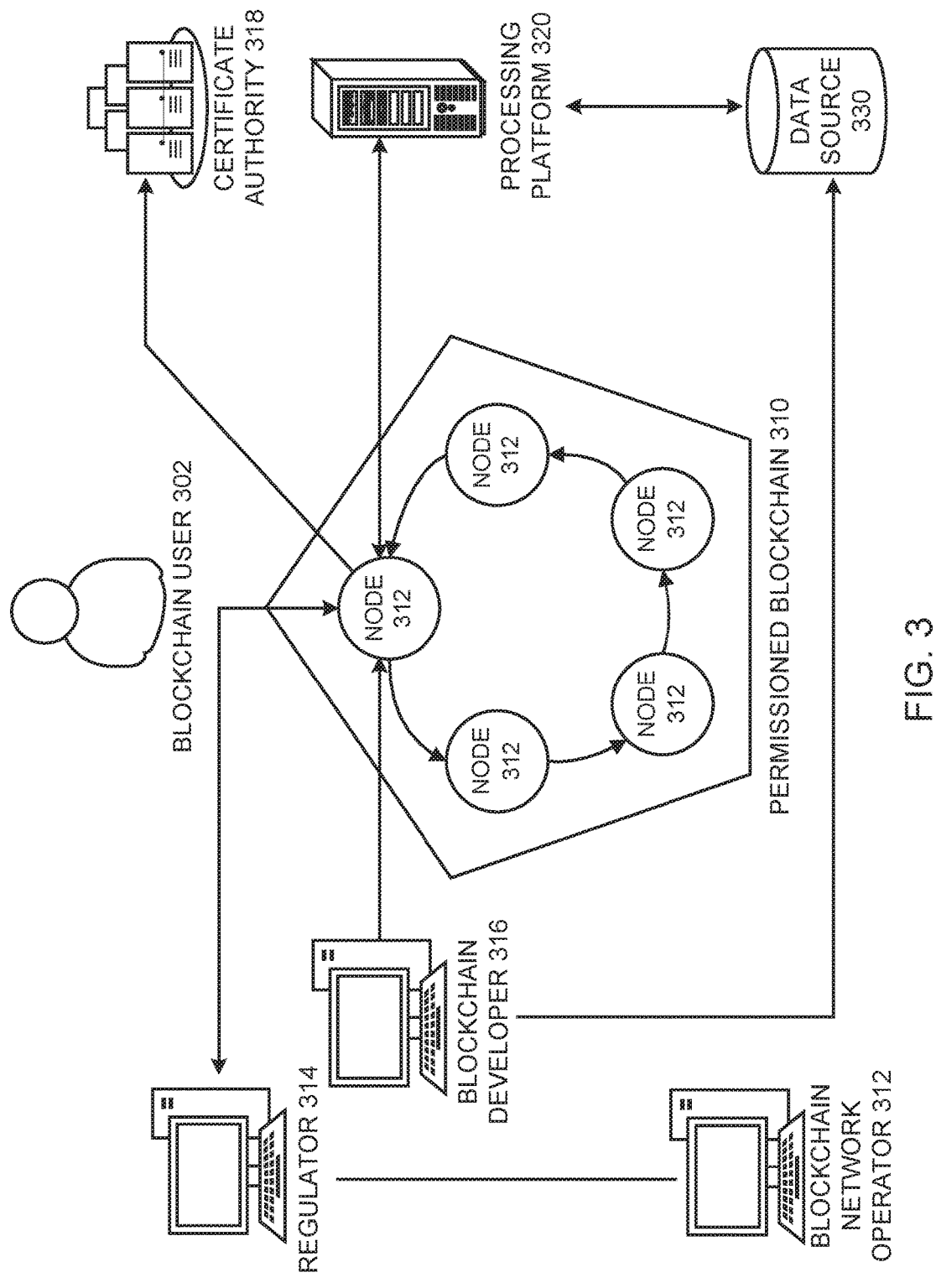
FIG. 3 is a diagram illustrating a permissioned blockchain network, according to example embodiments.

FIG. 3 illustrates an example of a permissioned blockchain network 300, which features a distributed, decentralized peer-to-peer architecture, and a certificate authority 318 managing user roles and permissions. In this example, the blockchain user 302 may submit a transaction to the permissioned blockchain network 310. In this example, the transaction can be a deploy, invoke, or query, and may be issued through a client-side application leveraging an SDK, directly through a REST API, or the like. Trusted business networks may provide access to regulator systems 314, such as auditors (the Securities and Exchange Commission in a U.S. equities market, for example). Meanwhile, a blockchain network operator system of nodes 312 manage member permissions, such as enrolling the regulator system 314 as an "auditor" and the blockchain user 302 as a "client". An auditor could be restricted only to querying the ledger whereas a client could be authorized to deploy, invoke, and query certain types of chaincode.

A blockchain developer system 316 writes chaincode and client-side applications. The blockchain developer system 316 can deploy chaincode directly to the network through a REST interface. To include credentials from a traditional data source 330 in chaincode, the developer system 316 could use an out-of-band connection to access the data. In this example, the blockchain user 302 connects to the network through a peer node 312. Before proceeding with any transactions, the peer node 312 retrieves the user's enrollment and transaction certificates from the certificate authority 318. In some cases, blockchain users must possess these digital certificates in order to transact on the permissioned blockchain network 310. Meanwhile, a user attempting to drive chaincode may be required to verify their credentials on the traditional data source 330. To confirm the user's authorization, chaincode can use an out-of-band connection to this data through a traditional processing platform 320.

Figure 4:
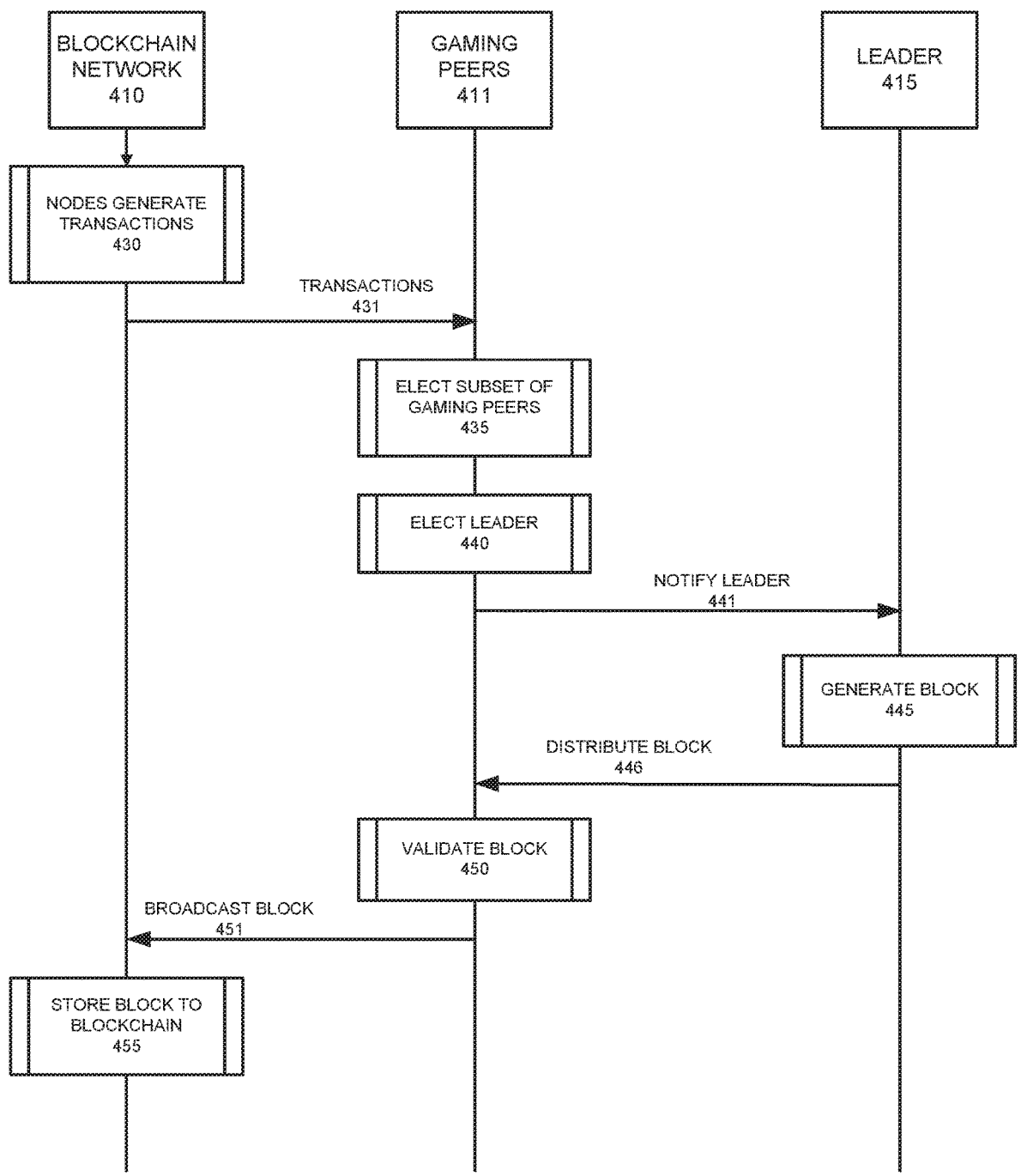
FIG. 4 illustrates a system messaging diagram for handling blockchain transactions in the expanded blockchain network, according to example embodiments.

FIG. 4 illustrates a system messaging diagram for handling blockchain transactions in the expanded blockchain network, according to example embodiments. Referring to FIG. 4, the system diagram 400 includes a blockchain network 410, gaming peers 411, and a leader 415 elected from the gaming peers 411. The blockchain network 410 begins the process by nodes generating transactions 431. The transactions 431 may be any sort of blockchain transactions 116, and the purpose of the blockchain network 112 may be related or unrelated to the massive multiplayer online gaming network 124. The transactions 431 can be anything relevant to the blockchain network 112. For example, the transactions 431 could hold information related to stocks transferred between nodes 104, provenance of consumer goods, votes, or any other information of interest for a blockchain use case.

For example, assume a blockchain network 410 where every transaction 431 corresponds to a stock transfer operation. The processing of transactions 431 needs to be fast, but the processing of transactions 431 is limited by the number of blockchain nodes 104. More nodes 104 are needed in order to be able to execute a trusted consensus protocol to increase the throughput. To address this limitation, massive networks of gaming peers 411 are available. The computing power of these gaming peers 411 may be used to generate transactions of blocks for the blockchain network 410. To achieve that, the gaming peers 411 are included in an expanded blockchain network 100 (thus the blockchain client 144 embedded in the gaming peer 411). Also, a trusted consensus protocol is needed (because the disclosed consensus protocol leverages the game state and gaming tampering detection techniques, the participants of the gaming network 124 may be trusted to execute the consensus algorithm). This approach augments the computing power of a conventional public or permissioned blockchain network 112 with the computing power of a massive network 124 several orders of magnitude larger than the existing blockchain network 112. With regard to confidentiality and privacy, consensus only takes care of the ordering of the transactions 431 inside a block, so no confidential details of the transaction 431 are required. This is the same model the ordering nodes from Hyperledger Fabric use: transactions 431 received by orderers have any confidential data stripped out; transactions 431 only has access to the endorsers signatures (the endorsement) and the read/write set (a list of variables read or written to the blockchain world state). If we compare this approach with Hyperledger Fabric, the gaming peers 411 will be equivalent to the orderers. However, due to the fact that the gaming peers 411 are not trusted by default they need to execute a more secure consensus protocol (discloses herein) than the consensus protocol executed by the orderers. Therefore, the present application outsources the blockchain network 112 consensus execution to a massive gaming network 124 to take advantage of its scalability and computing power leveraging its security features (game state tampering detection) and introducing a trustful consensus protocol that does not include the disadvantages of proof of work/proof of stake/proof of elapsed time/bft consensus protocols.

Gaming peers 411 of a massive multiplayer online gaming network 124 listen for the transactions 431. When a predetermined number of transactions 431 has been received, the gaming peers 411 elect a subset of the gaming peers 435 to participate in consensus for the received transactions.

Once the subset of gaming peers has been elected 435, a leader is elected 440. The leader 415 is a gaming peer 411 that will create a block 120 for the blockchain corresponding to the predetermined number of received transactions 431. In response to electing the leader 440, the subset of gaming peers 411 notify the leader 441 of the leader status. The gaming peer 411 designated as the leader 415 then generates the block 445 corresponding to the predetermined number of received transactions 431, and distributes the block to the subset of gaming peers 446.

Each of the subset of gaming peers 411 validates the block 450. Gaming peers 411 validate transactions 431 without requiring access to confidential data from the transaction 431. It is similar to how orderers from Hyperledger Fabric validates transactions 431. For example, if the blockchain network 410 is in fact a Hyperledger Fabric Blockchain network, the gaming peers 411 will validate the transaction's endorsers signatures and the read/write set. If the blockchain network 410 is a bitcoin blockchain network, then gaming peers 411 will validate the signature of the transaction and the UTXO of the transaction. In summary, the gaming peers 411 will validate transactions in a similar way a particular blockchain network 410 does. If at some point confidential data access is required for the gaming peer 411 to perform the validation, then it needs to be analyzed if it is worth the risk of releasing confidential data to an untrusted gaming peer 411. Following validation, the block is broadcast 451 to the blockchain network 410, thereafter the block is stored to the blockchain 455.

Figure 5A:
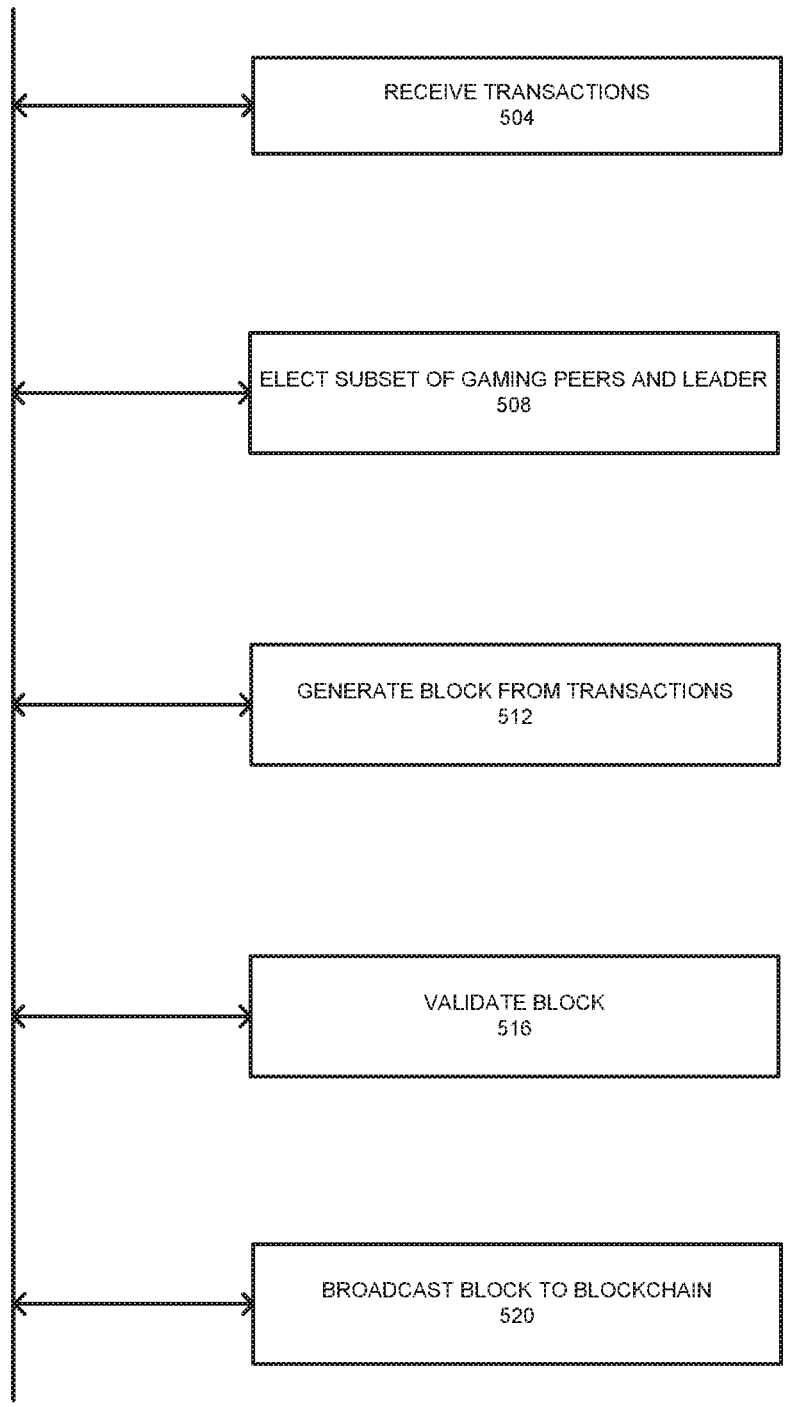
FIG. 5A illustrates a flow diagram of an example method of receiving transactions and committing blocks to a blockchain, according to example embodiments.

FIG. 5A illustrates a flow diagram of an example method of receiving transactions and committing blocks to a blockchain, according to example embodiments. Referring to FIG. 5A, the method 500 may include gaming peers 411 of the massive multiplayer online gaming network 124 receiving transactions 504. Each gaming peer 411 counts the received transactions 431 until a predetermined count or number is reached. For example, if a blockchain network 112 requires a block 120 to be generated every 5 minutes with a block size of at most 1 MB, then the gaming peers 128 can listen for transactions until they collect 1 MB of transaction data or until a 4 minute timer expires (assuming 1 minute for the consensus round).

At that point, the gaming peers 411 elect a subset of gaming peers to participate in consensus, and a leader 508 to process the block 120 for the predetermined number of transactions 431. Although a particular distributed random number algorithm is described herein, it should be understood that any existing secure distributed random number generation algorithm may be used instead.

Electing a subset of gaming peers 411 begins when every blockchain client 144 picks a value between 0 and 1 and broadcasts to the other gaming peers 411 its ID (e.g., could be its process ID) and the value picked. When a broadcast client 144 receives these values it inserts the generated value (0 or 1) into an array at the ID position. At the end of the process all the broadcast clients 144 will end with an array of bits. Election of the subset of gaming peers 508 is best illustrated by the following example. Assume there are 10 gaming peers 411 with IDs 1-10. Each gaming peer 411 selects randomly an integer value between 0 and 1 (meaning the gaming peers 411 can only choose 0 or 1). Assuming the gaming peers 411 select the following values: gaming peer 01 chooses 0, gaming peer 02 chooses 0, gaming peer 03 chooses 1, gaming peer 04 chooses 0, gaming peer 05 chooses 1, gaming peer 06 chooses 0, gaming peer 07 chooses 1, gaming peer 08 chooses 0, gaming peer 09 chooses 0, and gaming peer 10 chooses 0. A 10-bit number is formed with value 0010101000 (note that the gaming peer 01 selected value is the leftmost bit in the 10 bit number and the gaming peer 10 selected value is the rightmost bit in the 10 bit number). When a blockchain client 144 receives the 10-bit numbers from the other 9 gaming peers 411, it keeps a tally on how many times it received the same value. Each blockchain client 144 replaces its generated value with the received value with the higher tally.

The election rule/rules 148 to be used are selected using the generated random number with the highest tally. Every gaming peer 411 (or at least the majority of them) will end knowing the same random number, so they will pick the same rule(s) 148. It does not matter if a smaller number of gaming peers 411 try to use a different election rule 148 (as a result of a connectivity issue or a malicious behavior); the result in that case will be the gaming peers 411 not reaching consensus.

There is no fixed interval for the distributed random number generation to be executed. The random number generation occurs before the consensus round to select the subset of gaming peers 411 that will participate, so it depends on the total time needed to execute one round of the disclosed consensus protocol. The total time may be tuned depending on the number of transactions 431 (i.e. predetermined number) required to generate a block 120. Also, it is possible to have a hybrid approach: wait for x transactions 431 to generate a block 120 or y minutes, whatever occurs first. However, this may lead to variable block sizes.

With respect to leader 415 selection, the gaming peers 411 generate a random number in a distributed way (similar to selecting the subset of gaming peers 411). The generated value is used to select the leader 415 (for instance, this value can be mapped to the address of the leader 415 or to its process ID), the leader 415 is notified of its election by the subset of gaming peers 411. If the leader 415 does not respond in a certain period of time (due to a network connectivity problem or because the leader's 415 gaming peer is unresponsive) a new leader 415 is elected by regenerating the random number. If no leader 415 can be elected after several attempts, then the consensus round is discarded, the gaming peers 411 for a short random period of time, and a new consensus round starts over.

The leader 415 generates a block 120 from the received transactions 504, and transfers the block to the subset of gaming peers 411. The subset of gaming peers 411 validate the transactions in the block, and broadcast the block 120 to the blockchain. Once the blockchain network 112 receives the new block 120, the block 120 is stored to the blockchain.

Figure 5B:
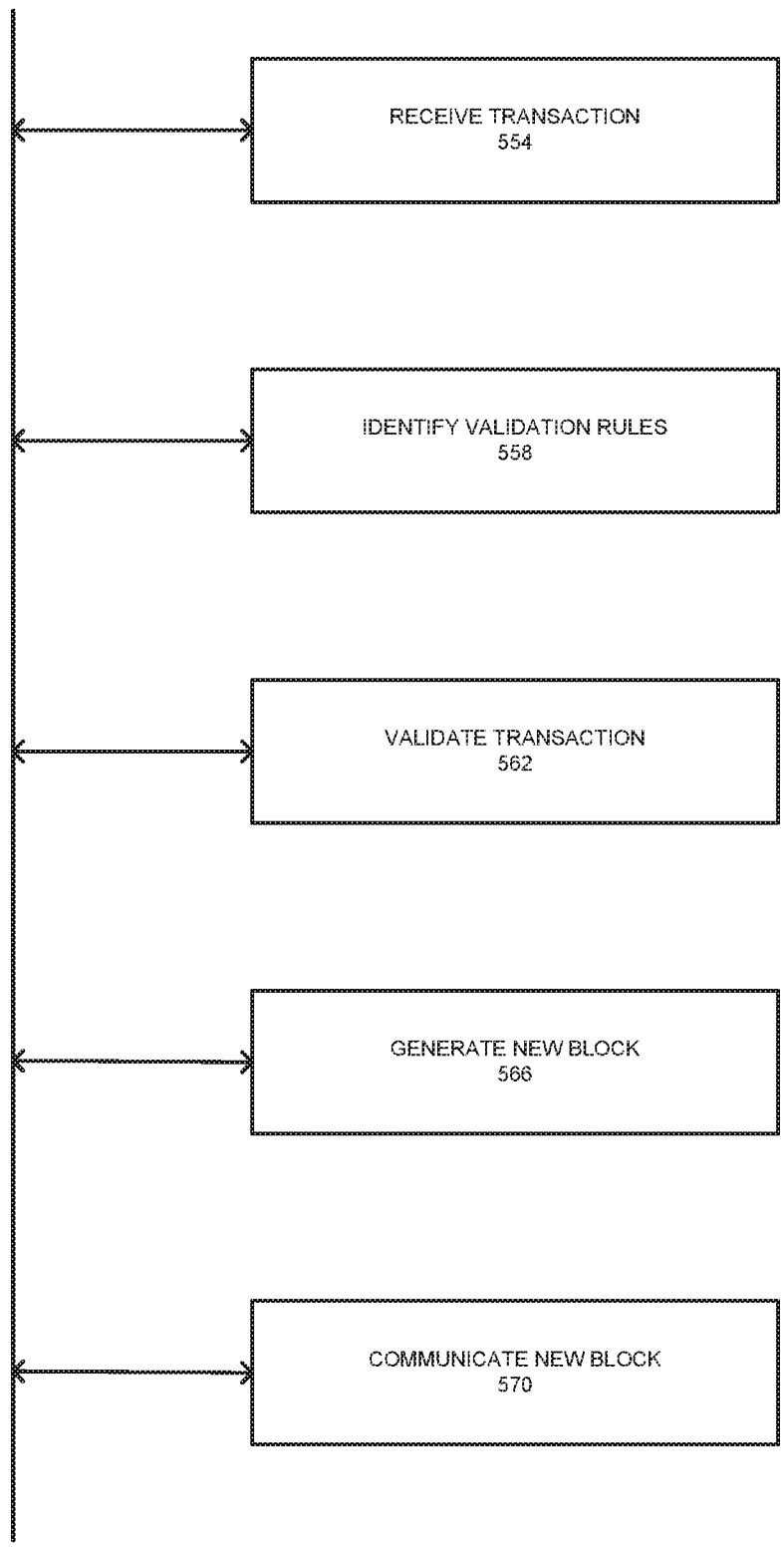
FIG. 5B illustrates a flow diagram of an example method of validating transactions for a blockchain, according to example embodiments.

FIG. 5B illustrates a flow diagram of an example method of validating transactions for a blockchain, according to example embodiments. The method 550 may include receiving a transaction, at block 554. The transaction may be received from a node 104 or participant in the blockchain network 112. The transaction may include metadata, inputs, and outputs.

At block 558, validation rules are identified. The blockchain client identifies in data stored in a plurality of blocks of the blockchain, one more rules for validation of the transaction. Dynamic rules may be stored in a repository maintained by the blockchain software, which may be cryptographically protected. In one embodiment, dynamic rules and subsequent changes thereto, e.g. new dynamic rules or modifications to existing rules, may be processed similar to transactions and blocks, and themselves be stored in a blockchain data structure, which may be the same or a different blockchain in which transactions are stored. Furthermore, rule change messages may be cryptographically validated in order to be accepted by the blockchain software. When a blockchain client accepts a rule change and incorporates it into a mined block, that block is then propagated to other entities for validation and acceptance. A block mined by another blockchain client that contains a validated rule change is accepted and stored in the receiving entities' blockchain, thereby incorporating the rule change therein.

Blockchain software, e.g. miner and node software, may, in addition to following static validation rules encoded in the software itself, also examine the blockchain and/or validate transactions and perform mining, etc. according to these dynamic rules. In particular, the blockchain software may continually evaluate the validity specification of each dynamic rule and, based thereon, would determine the set of rules valid at the time in question, e.g. the current time, or the block number that is being mined or validated. It would then enforce the rules valid at the time in question, either in selecting transactions and mining a block, or determining if another block is valid.

When a blockchain client is setup or installed, the blockchain software may parse the blockchain to identify the dynamic rules and values for the dynamic rules. For example, at startup, the blockchain software may have a blank set of validation rules. The blockchain software may start at the beginning of the blockchain (genesis block or block 0) and identify any rule changes. The blockchain software proceeds by parsing each block from the beginning to the most recent block to generate a set of current rules for validation. More recent rules may override rules that were implemented at an earlier date. For example, a removal of a user from a whitelist may override the addition of the user to the whitelist. In one embodiment, the blockchain software may identify an initial set of validation rules from the genesis block or block 0. The genesis block or subsequent block may include values for each of the rules set forth in the genesis block.

At block 562, the transaction is validated. Different validation rules may include a timing mechanism for when the validation rules are to be implemented. For example, a change to a validation rule may be stored in a block on the blockchain. However, if the time for the implementation of the validation rule has not been reached, the blockchain client will use the older rule to validate the transaction. For example, a fee change may be set to take place on the 1st of the month. While this rule may be identified, if the 1st of the month has not been reached yet, the blockchain client will still use the old fee instead.

The validation rules may include one or more of the following: a whitelist of wallet addresses that may hold and/or transact in the digital asset, a blacklist of wallet addresses that are prohibited from holding and/or transacting in the digital asset, a certificate revocation list of invalid certificates, a list of wallet addresses authorized to sign certificates that authorize users to use the blockchain, technical parameters about the blockchain (such as the maximum block size and parameters governing the average frequency at which blocks are mined), transaction fee schedules (including minimum, maximum, and percent fees, and the ability to assign different fee schedules to different senders and receivers such as when sending airline miles to an airline to purchase a ticket, the transaction fee may not apply, but when giving the miles to a relative as a gift, it would apply), demurrage fees, inactivity fees, how fees are to be assessed (destruction of the digital asset, payment to the miner, payment to a specified address), miner and node rewards (if any), the identity of parties allowed to issue assets and the parameters (e.g. 2 out of the following 3 keys must sign) for authorizing the request, the identity of parties allowed to confiscate assets (e.g. to enforce a court order), and the parameters (e.g. 2 out of the following 3 keys must sign) for authorizing the request, the maximum number of decimal places of precision for transactions, the minimum and maximum sizes for transactions, the maximum account balance, cumulative limits for transactions, the identity of parties allowed to change rules, the types of rules the parties are allowed to change, and the parameters (e.g. 2 out of the following 3 keys must sign) for authorizing the request.

At block 566, a new block on the blockchain is generated. The blockchain client generates a new block including the transaction. Blockchain clients validate the transaction and add the transaction to a new block.

At block 570, the new block is communicated. Once the block has been finished and a proof-of-work accomplished, the blockchain client communicates data indicative of the new block to the network of entities implementing the blockchain. When a block is added to the blockchain and validated by the blockchain clients in the network, the block becomes a permanent part of the blockchain. The next block will contain a hash of the added block's header that links the two blocks together and makes up the chain. However, for the first block in the chain, there is no previous block. A genesis block or block 0 may be used to start or seed the blockchain.

Figure 6A:
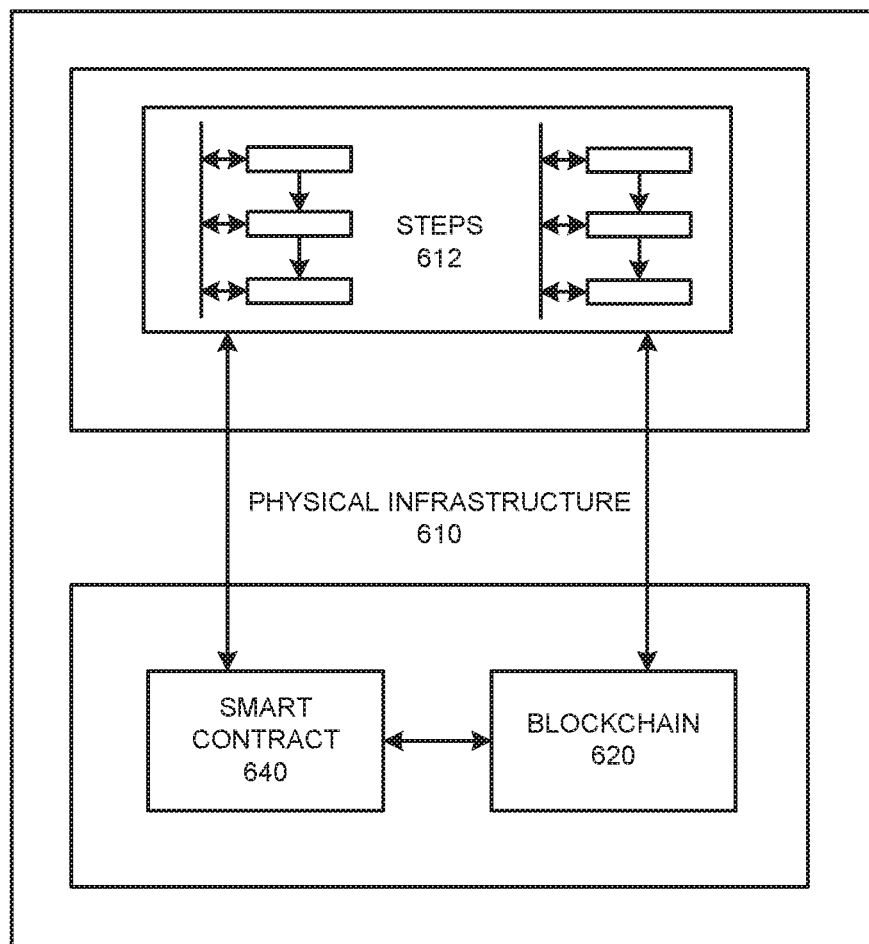
FIG. 6A illustrates an example physical infrastructure configured to perform various operations on the blockchain in accordance with one or more operations described herein, according to example embodiments.

FIG. 6A illustrates an example physical infrastructure configured to perform various operations on the blockchain in accordance with one or more of the example methods of operation according to example embodiments. Referring to FIG. 6A, the example configuration 600A includes a physical infrastructure 610 with a blockchain 620 and a smart contract 640, which may execute any of the operational steps 612 included in any of the example embodiments. The steps/operations 612 may include one or more of the steps described or depicted in one or more flow diagrams and/or logic diagrams. The steps may represent output or written information that is written or read from one or more smart contracts 640 and/or blockchains 620 that reside on the physical infrastructure 610 of a computer system configuration. The data can be output from an executed smart contract 640 and/or blockchain 620. The physical infrastructure 610 may include one or more computers, servers, processors, memories, and/or wireless communication devices.

Figure 6B:
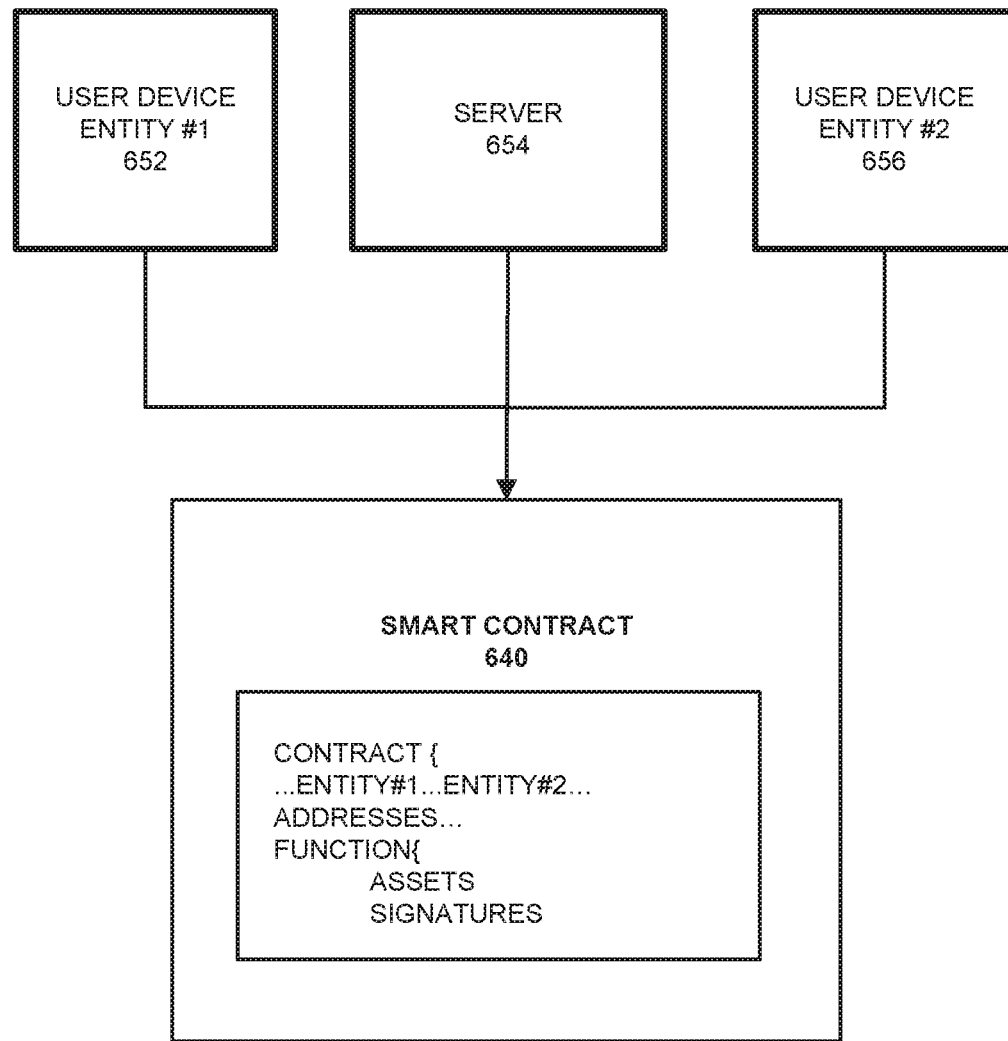
FIG. 6B illustrates an example smart contract configuration among contracting parties and a mediating server configured to enforce smart contract terms on a blockchain, according to example embodiments.

FIG. 6B illustrates an example smart contract configuration among contracting parties and a mediating server configured to enforce the smart contract terms on the blockchain according to example embodiments. Referring to FIG. 6B, the configuration 650 may represent a communication session, an asset transfer session or a process or procedure that is driven by a smart contract 640 which explicitly identifies one or more user devices 652 and/or 656. The execution, operations and results of the smart contract execution may be managed by a server 654. Content of the smart contract 640 may require digital signatures by one or more of the entities 652 and 656 which are parties to the smart contract transaction. The results of the smart contract execution may be written to a blockchain as a blockchain transaction.

The above embodiments may be implemented in hardware, in a computer program executed by a processor, in firmware, or in a combination of the above. A computer program may be embodied on a computer readable medium, such as a storage medium. For example, a computer program may reside in random access memory ("RAM"), flash memory, read-only memory ("ROM"), erasable programmable read-only memory ("EPROM"), electrically erasable programmable read-only memory ("EEPROM"), registers, hard disk, a removable disk, a compact disk read-only memory ("CD-ROM"), or any other form of storage medium known in the art.

An exemplary storage medium may be coupled to the processor such that the processor may read information from, and write information to, the storage medium. In the alternative, the storage medium may be integral to the processor. The processor and the storage medium may reside in an application specific integrated circuit ("ASIC"). In the alternative, the processor and the storage medium may reside as discrete components. For example, FIG. 7 illustrates an example computer system architecture 700, which may represent or be integrated in any of the above-described components, etc.

Figure 7:
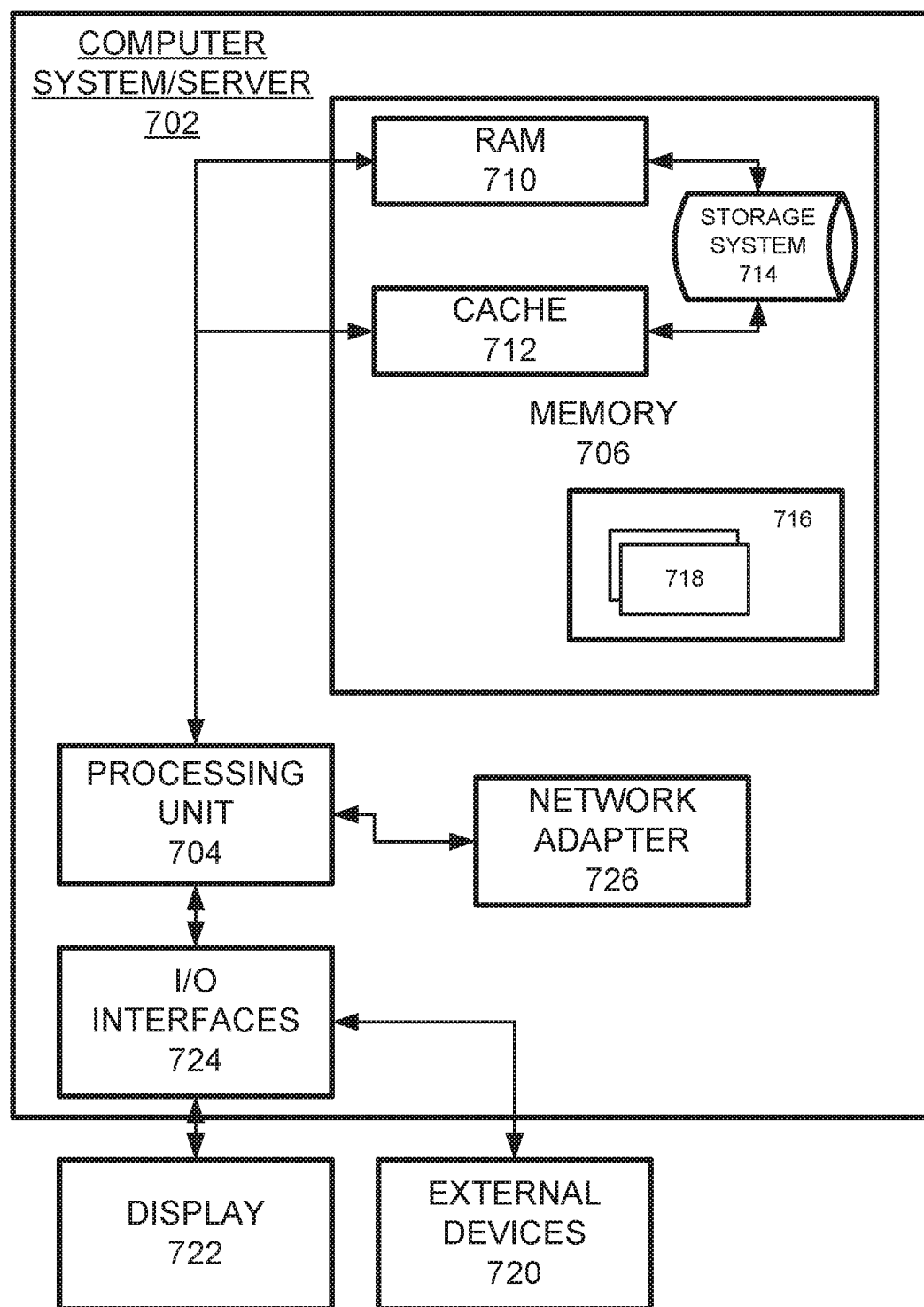
FIG. 7 illustrates an example computer system configured to support one or more of the example embodiments.

FIG. 7 is not intended to suggest any limitation as to the scope of use or functionality of embodiments of the application described herein. Regardless, the computing node 700 is capable of being implemented and/or performing any of the functionality set forth hereinabove.

In computing node 700 there is a computer system/server 702, which is operational with numerous other general purpose or special purpose computing system environments or configurations. Examples of well-known computing systems, environments, and/or configurations that may be suitable for use with computer system/server 702 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 702 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 702 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 7, computer system/server 702 in cloud computing node 700 is shown in the form of a general-purpose computing device. The components of computer system/server 702 may include, but are not limited to, one or more processors or processing units 704, a system memory 706, and a bus that couples various system components including system memory 706 to processor 704.

The bus represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 702 typically includes a variety of computer system readable media. Such media may be any available media that is accessible by computer system/server 702, and it includes both volatile and non-volatile media, removable and non-removable media. System memory 706, in one embodiment, implements the flow diagrams of the other figures. The system memory 706 can include computer system readable media in the form of volatile memory, such as random-access memory (RAM) 710 and/or cache memory 712. Computer system/server 702 may further include other removable/non-removable, volatile/non-volatile computer system storage media. By way of example only, storage system 714 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to the bus by one or more data media interfaces. As will be further depicted and described below, memory 706 may include one or more program products having a set (e.g., one or more) of program modules that are configured to carry out the functions of various embodiments of the application.

Program/utility 716, having a set (one or more) of program modules 718, may be stored in memory 706 by way of example, and not limitation, as well as an operating system, one or more application programs, other program modules, and program data. Each of the operating system, one or more application programs, other program modules, and program data or some combination thereof, may include an implementation of a networking environment. Program modules 718 generally carry out the functions and/or methodologies of various embodiments of the application as described herein.

As will be appreciated by one skilled in the art, aspects of the present application may be embodied as a system, method, or computer program product. Accordingly, aspects of the present application may take the form of an entirely hardware embodiment, an entirely software embodiment (including firmware, resident software, micro-code, etc.) or an embodiment combining software and hardware aspects that may all generally be referred to herein as a "circuit," "module" or "system". Furthermore, aspects of the present application may take the form of a computer program product embodied in one or more computer readable medium(s) having computer readable program code embodied thereon.

Computer system/server 702 may also communicate with one or more external devices 720 such as a keyboard, a pointing device, a display 722, etc.; one or more devices that enable a user to interact with computer system/server 702; and/or any devices (e.g., network card, modem, etc.) that enable computer system/server 702 to communicate with one or more other computing devices. Such communication can occur via I/O interfaces 724. Still yet, computer system/server 702 can communicate with one or more networks such as a local area network (LAN), a general wide area network (WAN), and/or a public network (e.g., the Internet) via network adapter 726. As depicted, network adapter 726 communicates with the other components of computer system/server 702 via a bus. It should be understood that although not shown, other hardware and/or software components could be used in conjunction with computer system/server 702. Examples, include, but are not limited to: microcode, device drivers, redundant processing units, external disk drive arrays, RAID systems, tape drives, and data archival storage systems, etc.

Although an exemplary embodiment of one or more of a system, method, and non-transitory computer readable medium has been illustrated in the accompanied drawings and described in the foregoing detailed description, it will be understood that the application is not limited to the embodiments disclosed, but is capable of numerous rearrangements, modifications, and substitutions as set forth and defined by the following claims. For example, the capabilities of the system of the various figures can be performed by one or more of the modules or components described herein or in a distributed architecture and may include a transmitter, receiver or pair of both. For example, all or part of the functionality performed by the individual modules, may be performed by one or more of these modules. Further, the functionality described herein may be performed at various times and in relation to various events, internal or external to the modules or components. Also, the information sent between various modules can be sent between the modules via one or more of: a data network, the Internet, a voice network, an Internet Protocol network, a wireless device, a wired device and/or via plurality of protocols. Also, the messages sent or received by any of the modules may be sent or received directly and/or via one or more of the other modules.

One skilled in the art will appreciate that a "system" could be embodied as a personal computer, a server, a console, a personal digital assistant (PDA), a cell phone, a tablet computing device, a smartphone or any other suitable computing device, or combination of devices. Presenting the above-described functions as being performed by a "system" is not intended to limit the scope of the present application in any way but is intended to provide one example of many embodiments. Indeed, methods, systems and apparatuses disclosed herein may be implemented in localized and distributed forms consistent with computing technology.

It should be noted that some of the system features described in this specification have been presented as modules, in order to more particularly emphasize their implementation independence. For example, a module may be implemented as a hardware circuit comprising custom very large-scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices, graphics processing units, or the like.

A module may also be partially implemented in software for execution by various types of processors. An identified unit of executable code may, for instance, comprise one or more physical or logical blocks of computer instructions that may, for instance, be organized as an object, procedure, or function. Nevertheless, the executables of an identified module need not be physically located together but may comprise disparate instructions stored in different locations which, when joined logically together, comprise the module and achieve the stated purpose for the module. Further, modules may be stored on a computer-readable medium, which may be, for instance, a hard disk drive, flash device, random access memory (RAM), tape, or any other such medium used to store data.

Indeed, a module of executable code could be a single instruction, or many instructions, and may even be distributed over several different code segments, among different programs, and across several memory devices. Similarly, operational data may be identified and illustrated herein within modules and may be embodied in any suitable form and organized within any suitable type of data structure. The operational data may be collected as a single data set or may be distributed over different locations including over different storage devices, and may exist, at least partially, merely as electronic signals on a system or network.

It will be readily understood that the components of the application, as generally described and illustrated in the figures herein, may be arranged and designed in a wide variety of different configurations. Thus, the detailed description of the embodiments is not intended to limit the scope of the application as claimed but is merely representative of selected embodiments of the application.

One having ordinary skill in the art will readily understand that the above may be practiced with steps in a different order, and/or with hardware elements in configurations that are different than those which are disclosed. Therefore, although the application has been described based upon these preferred embodiments, it would be apparent to those of skill in the art that certain modifications, variations, and alternative constructions would be apparent.

While preferred embodiments of the present application have been described, it is to be understood that the embodiments described are illustrative only and the scope of the application is to be defined solely by the appended claims when considered with a full range of equivalents and modifications (e.g., protocols, hardware devices, software platforms etc.) thereto.

What is claimed is:

1. A system, comprising:
    a blockchain network comprising a hardware processor;
    a gaming network, comprising a hardware processor, coupled to the blockchain network, comprising:
        gaming peers, configured to receive transactions from the blockchain network, and in response:
            elect a subset of gaming peers to verify the transactions and a leader from the subset of gaming peers;
            generate, by the leader, a block comprising the number of transactions;
            validate the block, by the subset of gaming peers; and
            broadcast the block to the blockchain network.

2. The system of claim 1, wherein the gaming peers monitor the transactions and elect, generate, verify, and broadcast in response to the receipt of a predetermined number of transactions.

3. The system of claim 2, wherein the gaming peers each comprises election rules, the election rules specific to a game played on the gaming network and allow a chance for every gaming peer to be elected to the subset of gaming peers.

4. The system of claim 3, wherein each gaming peer generates a number, the number used to select a rule of the election rules to apply to a game state, wherein in response to a gaming peer determines the rule holds true for the game state, the subset comprises the gaming peer.

5. The system of claim 2, wherein the block comprises a hash of a current game state, a hash of the rule, and a block signature, the current game state relevant to the rule.

6. The system of claim 2, wherein in response to the leader generates the block, the leader broadcasts the block to the subset of gaming peers, wherein the subset of gaming peers validate the block comprises the subset of gaming peers verifies a leader signature and a game state hash.

7. The system of claim 6, wherein the gaming peers that validate the block attach their own signature to the block.

8. A method, comprising:
    receiving, by gaming peers of a gaming network, a number of transactions from a blockchain network;
    electing a subset of gaming peers to verify the transactions and a leader from the subset of gaming peers;
    generating, by the leader, a block comprising the number of transactions;
    validating the block, by the subset of gaming peers; and
    broadcasting the block to the blockchain network.

9. The method of claim 8, further comprising:
    monitoring the transactions, by each of the gaming peers, and electing, generating, verifying, and broadcasting in response to receiving a predetermined number of transactions.

10. The method of claim 9, wherein the gaming peers each comprising election rules, the election rules specific to a game played on the gaming network and allowing a chance for every gaming peer to be elected to the subset of gaming peers.

11. The method of claim 10, further comprising:
    generating by each gaming peer, a number used to select a rule of the election rules to apply to a game state; and
    determining the rule holds true for the game state, and in response:
        including the gaming peer in the subset of gaming peers.

12. The method of claim 9, wherein the block comprises a hash of a current game state, a hash of the rule, and a block signature, the current game state relevant to the rule.

13. The method of claim 12, wherein in response to generating the block, the method further comprising:
- broadcasting the block to the subset of gaming peers, by the leader,
- wherein validating the block by the subset of gaming peers comprising:
  - verifying a leader signature and a game state hash.

14. The method of claim 13, wherein gaming peers that validate the block attach their own signature to the block.

15. A non-transitory computer readable medium comprising instructions, that when read by a processor, cause the processor to perform:
- receiving, by gaming peers of a gaming network, a number of transactions from a blockchain network;
- electing a subset of gaming peers to verify the transactions and a leader from the subset of gaming peers;
- generating, by the leader, a block comprising the number of transactions;
- validating the block, by the subset of gaming peers; and
- broadcasting the block to the blockchain network.

16. The non-transitory computer readable medium of claim 15, wherein the processor being further configured to perform:
- monitoring the transactions, by each of the gaming peers, and electing, generating, verifying, and broadcasting in response to receiving a predetermined number of transactions.

17. The non-transitory computer readable medium of claim 16, wherein gaming peers each comprising election rules, the election rules specific to a game played on the gaming network and allowing a chance for every gaming peer to be elected to the subset of gaming peers.

18. The non-transitory computer readable medium of claim 17, wherein the processor being further configured to perform:
- generating by each gaming peer, a number used to select a rule of the election rules to apply to a game state; and
- determining the rule holds true for the game state, and in response:
  - including the gaming peer in the subset of gaming peers.

19. The non-transitory computer readable medium of claim 16, wherein the block comprises a hash of a current game state, a hash of the rule, and a block signature, the current game state relevant to the rule.

20. The non-transitory computer readable medium of claim 19, wherein in response to generating the block, the processor being further configured to perform:
- broadcasting the block to the subset of gaming peers, by the leader,
- wherein validating the block by the subset of gaming peers comprising:

verifying a leader signature and a game state hash.

* * * * *